US010181052B2

(12) United States Patent
Li et al.

(10) Patent No.: US 10,181,052 B2
(45) Date of Patent: Jan. 15, 2019

(54) NOTIFICATION OF CONTACT STATUS OF REMOTE USER

(71) Applicant: Intel Corporation, Santa Clara, CA (US)

(72) Inventors: Hong Li, El Dorado Hills, CA (US); Sharad K. Garg, Portland, OR (US); Mark D. Yarvis, Portland, OR (US); Joshua Boelter, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/367,992

(22) PCT Filed: Dec. 19, 2013

(86) PCT No.: PCT/US2013/076669
§ 371 (c)(1),
(2) Date: Jun. 23, 2014

(87) PCT Pub. No.: WO2015/094304
PCT Pub. Date: Jun. 25, 2015

(65) Prior Publication Data
US 2016/0314318 A1 Oct. 27, 2016

(51) Int. Cl.
*G06F 21/62* (2013.01)
*H04L 12/58* (2006.01)
(Continued)

(52) U.S. Cl.
CPC ......... *G06F 21/6263* (2013.01); *G06Q 10/06* (2013.01); *G06Q 10/107* (2013.01); *H04L 51/32* (2013.01)

(58) Field of Classification Search
CPC ......... H04L 63/08; H04L 29/06; G06F 15/16; G06F 21/62; G06F 21/6245;
(Continued)

(56) References Cited

U.S. PATENT DOCUMENTS 8,359,629 B2 * 1/2013 Kohlenberg ...... H04M 1/72569
455/411
2002/0024947 A1 * 2/2002 Luzzatti .............. H04L 12/6418
370/352
(Continued)

FOREIGN PATENT DOCUMENTS

CN 102033744 A 4/2011
EP 2302886 A1 3/2011
(Continued)

OTHER PUBLICATIONS

Singh et al., A Survey of Security Issues and Solutions in Presence, 2006.*
(Continued)

*Primary Examiner* — Benjamin E Lanier
*Assistant Examiner* — Huan V Doan
(74) *Attorney, Agent, or Firm* — Barnes & Thornburg LLP

(57) ABSTRACT

Technologies for informing a remote user of a local user's availability to receive a contact on a communication device are disclosed. The availability of the local user may be determined based on the local user's context information, which may be reported to the remote user in response to a contact status request. The local user's context information provided to the remote user may inform, for example, whether the local user is available to receive a contact, the best way to contact the local user, and/or other context information of the local user. The type and/or level of specificity of the local user's context information reported to the remote user may be determined based on a privacy level, which may be determined based on the local user's context, the identity of the remote user, and/or other criteria. In some embodiments, contact status updates may be provided to the remote user.

19 Claims, 7 Drawing Sheets

(51) Int. Cl.
*G06Q 10/10* (2012.01)
*G06Q 10/06* (2012.01)

(58) Field of Classification Search
CPC ............. G06F 21/6254; G06F 21/6263; G06F 21/6272; G06Q 10/063114; G06Q 10/107; G06Q 10/109
See application file for complete search history.

(56) References Cited

U.S. PATENT DOCUMENTS

| | | | |
|---|---|---|---|
| 2006/0015609 A1* | 1/2006 | Hagale | H04L 67/22 709/224 |
| 2007/0126581 A1* | 6/2007 | Sung | G07C 9/00111 340/572.1 |
| 2007/0130256 A1 | 6/2007 | Moore et al. | |
| 2008/0086531 A1* | 4/2008 | Chavda | G06Q 10/107 709/206 |
| 2009/0047972 A1* | 2/2009 | Neeraj | G06Q 10/10 455/456.1 |
| 2011/0064074 A1* | 3/2011 | Kreitzberg | H04L 67/24 370/352 |
| 2011/0183645 A1 | 7/2011 | Chawla | |
| 2013/0217350 A1 | 8/2013 | Singh | |
| 2014/0179227 A1* | 6/2014 | Nousiainen | H04W 84/18 455/41.2 |

FOREIGN PATENT DOCUMENTS

| | | |
|---|---|---|
| WO | 00-62136 A1 | 10/2000 |
| WO | 2013147833 A1 | 10/2013 |
| WO | WO-2013147833 A1 * 10/2013 | ............. G09F 21/00 |

OTHER PUBLICATIONS

Godefroid et al.,Ensuring Privacy in Presence Awareness Systems an Automated Verification Approach, 2000, 10 pages.*
Dumitrache et al., Enabling Privacy-Preserving Semantic Presence in Instant Messaging Systems, 14 pages (Year: 2012).*
International Search Report and Written Opinion for Application No. PCT/US2013/076669, dated Aug. 29, 2014, 11 pages.
First Office Action dated Feb. 2, 2018 for Chinese Patent Application No. 201380081041.1, 16 pages.
Extended European Search Report dated Apr. 12, 2017, for Patent Application No. 13899479.3-1958, 7 pages.
Second Office Action in Chinese Patent Application No. 20130081041, dated Oct. 24, 2018, including machine translation (39 pages).

* cited by examiner

FIG. 6 — 600

| REQUESTOR (602) | PRIVACY LEVEL (604) |
|---|---|
| JOHN Q. | MEDIUM |
| MOM | HIGH |
| SAM | UNAUTHORIZED |
| WIFE | HIGH |
| WORK | LOW |

FIG. 7 — 700

| CONTEXT (702) | PRIVACY LEVEL: LOW (704) | | PRIVACY LEVEL: MEDIUM (706) | | PRIVACY LEVEL: HIGH (708) | |
|---|---|---|---|---|---|---|
| | CONTEXT INFO (710) | AVAILABILITY (712) | CONTEXT INFO (710) | AVAILABILITY (712) | CONTEXT INFO (710) | AVAILABILITY (712) |
| "ACTIVITY" (720) | LOW LEVEL SPECIFICITY | CONTACT INSTRUCTIONS | MED LEVEL SPECIFICITY | CONTACT INSTRUCTIONS | HIGH LEVEL SPECIFICITY | CONTACT INSTRUCTIONS |
| "LOCATION" (722) | LOW LEVEL SPECIFICITY | CONTACT INSTRUCTIONS | MED LEVEL SPECIFICITY | CONTACT INSTRUCTIONS | HIGH LEVEL SPECIFICITY | CONTACT INSTRUCTIONS |
| ACTIVITY = WATCHING MOVIE (724) | BUSY | DO NOT CONTACT | AT MOVIES | DO NOT CONTACT | AT BATMAN MOVIE UNTIL 7:00 PM | DO NOT CONTACT |
| LOCATION = AT HOME (726) | NEW YORK | DO NOT CONTACT | AT HOME | OK TO CONTACT | GPS COORDINATES | OK TO CONTACT |
| LOCATION = ON AIRPLANE (728) | BUSY | DO NOT CONTACT | BUSY | DO NOT CONTACT | BUSY | DO NOT CONTACT |

NOTIFICATION OF CONTACT STATUS OF REMOTE USER

CROSS REFERENCE TO RELATED APPLICATIONS

This application is a national stage entry under 35 USC § 371(b) of International Application No. PCT/US2013/076669, which was filed Dec. 19, 2013.

BACKGROUND

Many people rely on various personal communication devices, such as smart phones, tablet computers, and other computing devices, to contact each other. Such personal communication devices may offer a suite of different communication modalities to contact a recipient including, for example, voice, e-mail, texting, social networking, and/or other communication mechanisms. Due to the increasing use of personal communication devices, users can become bombarded with contacts from friends, family members, work colleagues, and even unknown parties. Such constant contact can occur even during times in which the recipient is busy or unable to accept or respond to the contact such as when the recipient is driving, participating in a meeting, watching a movie, or otherwise participating in an activity that limits the recipient's desire or ability to receive, or respond to, the contact.

Unfortunately, an individual attempting to contact a recipient has very limited ability to determine whether the recipient is able to accept or respond to the contact. While some communication modalities, such as instant messaging, provide some functionality to the potential recipient to indicate their current status (e.g., "I'm away from keyboard," "I'm busy," etc.), such functionality is typically limited to manual control by the recipient or automated "dumb" responses (e.g., a busy signal or voicemail) and provide minimal information to the individual attempting to contact the recipient. As such, the individual attempting to contact the recipient generally has limited options in response to an indication that the recipient is unavailable. For example, the individual may simply wait some undetermined amount of time and attempt to contact the recipient again at a later time, at which the recipient may or may not be available to accept/respond to the contact.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 is a simplified block diagram of at least one embodiment of a privacy policy data structure that may be stored in a context policy database of the local communication device of the system of FIG. 1;

FIG. 7 is a simplified block diagram of at least one embodiment of a context policy data structure that may be stored in the context policy database of the local communication device of the system of FIG. 1.

DETAILED DESCRIPTION OF THE DRAWINGS

Figure 1:
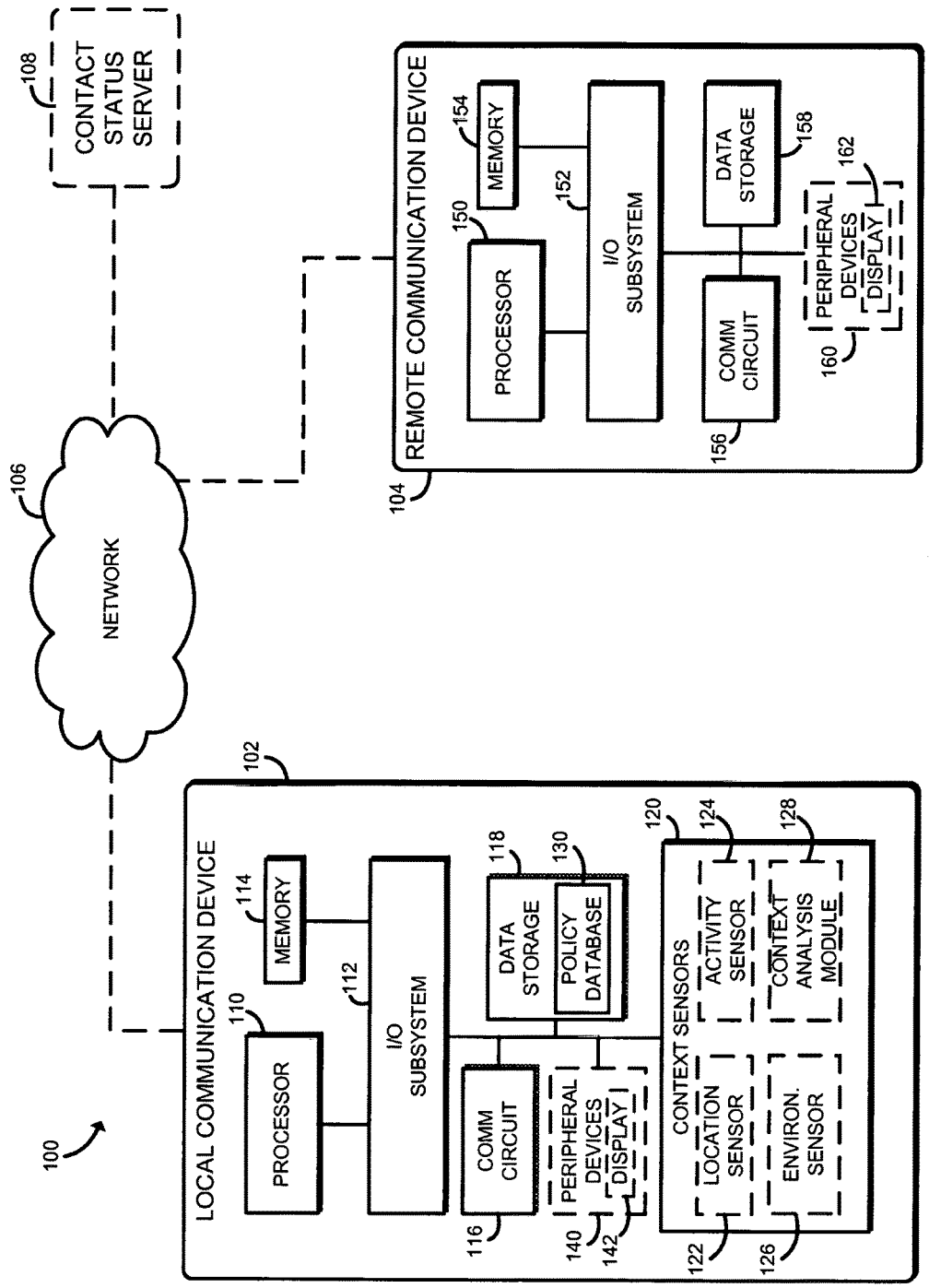
FIG. 1 is a simplified block diagram of at least one embodiment of a system for requesting and reporting a contact status of a user of a communication device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for requesting and reporting the contact status of a user includes a "local" communication device 102 and a "remote" communication device 104, which communicate with each over a network 106. In use, a user of the remote communication device 104 may request the contact status of the user of the local communication device 102 prior to, during, or subsequent to contacting the user of the local communication device 102. In this way, the user of the remote communication device 104 may be informed of the availability of the user of the local communication device 102 to receive a contact (e.g., a phone call, text message, etc.) prior to initiation of the contact itself. To do so, the remote communication device 104 transmits a contact status request to the local communication device 102 via the network 106. In response to the received contact status request, the local communication device 102 determines the current context of the user of the local communication device 102. The context of the user may include any type of context data useful in determining the availability and/or desire of the user to accept a contact from the user of the remote communication device, such as the current activity or location of the user.

The local communication device 102 responds to the contact status request with a contact status report. To do so, the local communication device 102 determines context information of the user based on the determined user's context and generates the contact status report including the context information. The particular context information included in the contact status report may be determined based on one or more criteria, such as the identity of the requestor, relationship of requestor to the user of the local communication device 102, the current context of the user, etc. For example, to provide an amount of privacy to the user, the local communication device 102 may also determine a privacy level based on the contact status request (e.g., based on the identity of the user of the remote communication device 104) and/or the current context of the user. The privacy level may indicate the type of context data and/or level of specificity of the user's context to be included in the context information. For example, a high privacy level may allow for very specific context data (e.g., the specific movie currently being watched by the user of the local communication device 102) to be included in the context information of the contact status report; whereas a low privacy level may allow only general or non-specific context data (e.g., only an indication that the user of the local communication device 102 is busy). In some embodiments, for example, the privacy level may be determined based on the relationship of the requestor (i.e., the user of the remote communication device 104). In this way, the level of disclosure of the user's context may be controlled by the user of the local communication device 102.

In addition to the user's context information, the contact status report may include additional information such as a preferred communication modality to receive a contact from the user of the remote communication device 104, a determination of the user's availability or willingness to accept a contact from the requestor, a customized message, a contact instruction, and/or other data useful in providing an indication of the user of the local communication device 102 to the user of the remote communication device 104. For example, a request from a family member of the user (e.g., a spouse or child) may be responded to with the user's phone number that may be used to contact the user, whereas a request from a work colleague of the user may be responded to with only an e-mail that may be used to contact the user.

The user of the remote communication device 104 may make an informed decision whether and/or when to contact the user of the local communication device 102 based on the received contact status report. Additionally, in some embodiments, the local communication device 102 may predict future context of the user and provide contact status updates to the remote communication device 104. In this way, the user of the remote communication device 104 may be informed when the user of the local communication device 102 is available to accept a contact.

In some embodiments, the system 100 may also include a remote contact status server 108. In such embodiments, the contact status server 108 may be configured to receive and respond to contact status requests from the remote communication device 104 on behalf of the local communication device 102 (e.g., when the device 102 is offline or out-of-service). In such embodiments, all contact status requests may be initially received by the contact status server 108, which may subsequently relay the contact status requests to the local communication device 102 when the device 102 is operational or handle the contact status requests on the server 108 itself when the device 102 is not operational (e.g., the server 108 may generate and respond with a contact status report). In this way, the dissemination of the user's context status may persist even though the local communication device 102 is offline, out-of-service, or otherwise unable to respond to a particular contact status request.

The local communication device 102 may be embodied as any type of communication device capable of facilitating communication with the remote communication device and performing the functions described herein. For example, the local communication device 102 may be embodied as a smartphone, a cellular phone, a tablet computer, a notebook computer, a laptop computer, a desktop computer, a smart watch, a wearable computing device, a distributed computing system, a multiprocessor system, a consumer electronic device, a smart appliance, and/or any other communication device capable of facilitating communications with the remote communication device 104. As shown in FIG. 1, the illustrative local communication device 102 includes a processor 110, an I/O subsystem 112, memory 114, a communication circuit 116, a data storage 118, and one or more context sensors 120. Of course, the communication device 102 may include other or additional components, such as those commonly found in a portable computer (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the communication device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the communication device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the communication device 102, on a single integrated circuit chip.

The communication circuitry 116 of the local communication device 102 may be embodied as any communication circuit, device, or collection thereof, capable of enabling communications between the local communication device 102 and the remote communication device 104. Depending on the particular type of communication modalities supported by the communication device 102, the communication circuitry 116 may be embodied as, or otherwise include, a cellular communication circuit, a data communication circuit, and/or other communication circuit technologies. As such, the communication circuit 116 may be configured to use any one or more suitable communication technology (e.g., wireless or wired communications) and associated protocols (e.g., GSM, CDMA, Ethernet, Bluetooth®, Wi-Fi®, WiMAX, etc.) to effect such communication.

The data storage 118 may be embodied as any type of device or devices configured for short-term or long-term storage of data such as, for example, memory devices and circuits, memory cards, hard disk drives, solid-state drives, or other data storage devices. The data storage device 118 may store various applications, program files, and other data used by the local communication device 102. For example, in the illustrative embodiment, a policy database 130 is stored in the data storage 118. The context policy database 130 may store historical and current context data of the user of the local communication device 102. Additionally, the context policy database 130 may include various privacy policy and/or context policy rules for determining context information of the user of the local communication device 102 based on the user's current context. For example, as discussed in more detail below, the privacy and context policy rules may define the type and level of specificity of the context information to be included in the contact status report based on the user's context and/or a privacy level assigned to the requesting party (i.e., based on the identity of the user of the remote communication device 104). In this way, the user of the local communication device 102 may control the type and amount of context information to be reported to the remote communication device 104.

The context sensor(s) 120 may be embodied as, or otherwise include, any type of sensor, circuit, software and/or hardware module, or other physical or logical device capable of detecting the context of user of the local communication device 102 (and/or of the local communication device 102 itself). The context of the user of the local communication device 102 may include any type of data or information useful in determining the availability of the user to receive a contact from the remote communication device 104. For example, the context of the user of the local communication device 102 may include, but is not limited to, the user's current location, the current activity of the user, the identity of the user, environmental conditions, the time of day, and/or other data indicative of the user's availability to receive the requested contact. For example, as shown in the illustrative embodiment of FIG. 1, the context sensors may include one or more location sensors 122 configured to sense data indicative of the location of the local communication device 102 or from which the location of the local communication device 102 may be inferred. For example, the location sensors 122 may be embodied as, or otherwise include, a global positioning system (GPS) circuit capable of determining the absolute geographical position of the local communication device 102. In some embodiments, the local communication device 102 may use the location sensors 122 to determine the location of the local communication device 102 relative to another device, which may be used to determine, for example, the absolute position of the local communication device 102. That is, in some embodiments, the local communication device 102 may implement triangulation and/or trilateration algorithms and techniques to determine the position of the local communication device 102 based on data generated by the location sensors 122 (e.g., using distances and/or angles to cellular network towers with known geographical positions).

The activity sensors 124 are configured to sense, or otherwise determine or infer, activities with which the user of the local communication device 102 is engaged. For example, the activity sensors 134 may sense whether the local communication device 102 (and likely therefore the user) is moving or stationary. As such, the activity sensors 134 may be embodied as, or otherwise include, one or more inertial sensors (e.g., accelerometers and gyroscopes), location sensors, and/or other sensors capable of generating data useful in determining the activity of the user and/or the local communication device 102.

The environmental condition sensors 126 may be embodied as any type of sensors, devices, components, and/or circuitry capable of producing data indicative of the surrounding environment of the local communication device 102. For example, in some embodiments, the environmental condition sensors 126 may sense characteristics of the physical environment of the local communication device 102 such as temperature, moisture, light, audio levels, and other physical characteristics.

The context analysis module 128 may be embodied as any type of devices, hardware and/or software components, and/or circuitry capable of analyzing data (e.g., software applications and/or data generated by software applications) stored on the local communication device 102. For example, a context analysis module 128 may analyze the user's calendar schedule information; historical call, text, e-mail, or other contact information; the current and future location of the local communication device 102 (e.g., based on locations of appointments); and/or other information stored on the local communication device 102 (e.g., use pattern information) to determine a context of the user (e.g., is the user watching a movie based on the user's calendar or call history). The context sensors 120 may include any number of context analysis modules 128 configured to analyze one or more software applications, application data, or other information to generate context information useable to determine or infer the user's availability to receive a contact from the remote communication device 104.

Of course, it should be appreciated that the number and type of context sensors 120 may vary based on the type of communication device 102 and/or implementation. As such, the context sensors 120 may include additional or other context sensors in other embodiments. For example, in some embodiments, the context sensors 120 may include emotional state sensors configured to generate data indicative of a user's emotional state, such as stressed, happy, contemplative, angry, etc. Such emotional state sensors may be embodied as any type of sensor capable of generating data indicative of the user's emotional state. For example, an emotional state sensor may be embodied as a camera device configured to generate an image of the user's face, which may be analyzed to determine the user's emotional state. Such emotional state context information may be used determine or infer the user's availability or desirability to receive a contact as discussed below.

The local communication device 102 may also include one or more peripheral devices 140 in some embodiments. Such peripheral devices 140 may include any type of peripheral device commonly found in a typical communication device or computer device, such as various input/output devices. For example, in some embodiments, the local communication device 102 includes a display 142 on which a user interface and/or other information may be displayed to a user of the local communication device 102. In such embodiments, the display 142 may be embodied as any type of display capable of displaying digital information such as a liquid crystal display (LCD), a light emitting diode (LED), a plasma display, a cathode ray tube (CRT), or other type of display device. In some embodiments, the display 142 may be coupled to a touch screen to receive user input.

The remote communication device 104 may be similar or dissimilar to the local communication device 102. As such, the remote communication device 104 may be embodied as a smartphone, a cellular phone, a tablet computer, a notebook computer, a laptop computer, a desktop computer, a smart watch, a wearable computing device, a distributed computing system, a multiprocessor system, a consumer electronic device, a smart appliance, and/or any other communication device capable of facilitating communications with the local communication device 102. As shown in FIG. 1, the illustrative remote communication device 104 includes a processor 150, an I/O subsystem 152, memory 154, a communication circuit 156, a data storage 158, and one or more peripheral devices 160 (e.g., a display 162) in some embodiments. Of course, the remote communication device 104 may include other or additional components, such as those commonly found in a communication device or computer device (e.g., various input/output devices), in other embodiments. The individual components of the remote communication device 104 may be similar to the corresponding components of the local communication device 102, the description of which is applicable to the corresponding components of the remote communication device 104 and is not repeated herein so as not to obscure the present disclosure. Further, it should be appreciated that the communication device 102 is referred to herein as a "local" communication device and the communication device 104 is referred to herein as a "remote" communication device merely for clarity of the description and such terms should not be considered limiting. For example, the remote communication device 104 may be relatively close (e.g., within the same building or room) as the local communication device 102. Additionally, it should be appreciated that each of the communication devices 102, 104 may be configured to perform the functions described below with regard to the local communication device 102. In such embodiments, the terms "local" and "remote" may be switched depending on the point of reference.

As discussed in more detail below, the local communication device 102 and remote communication device 104 are configured to communication with each other over the network 106. The network 106 may be embodied as any number of various wired and/or wireless voice and/or data networks. For example, the network 106 may be embodied as, or otherwise include, a cellular network, wired or wireless local area network (LAN), a wired or wireless wide area network (WAN), and/or a publicly-accessible, global network such as the Internet. As such, the network 106 may include any number of additional devices, such as additional computers, routers, and switches to facilitate communications among the devices of the system 100.

Additionally, as discussed above, the system 100 may include a remote contact status server 108 to provide a contact status request handling service for the local communication device 102. For example, the contact status server 108 may be configured to respond to contact status requests received from the remote communication device 104 on behalf of the local communication device 102 when the device 102 is offline, out-of-service, or otherwise unable to respond to the contact status request. To do so, the sever 108 may generate a contact status report utilizing the methodologies disclosed herein in regard to the generation of the contact status report by the local communication device 102. The contact status server 108 may be embodied as any type of server computing device, or collection of devices, capable of performing the functions described herein. As such, the contact status server 108 may be embodied as a single server computing device or a collection of servers and associated devices. For example, in some embodiments, the contact status server 108 may be embodied as a "virtual server" formed from multiple computing devices distributed across the network 106 and operating in a public or private cloud. Accordingly, although the contact status server 108 is illustrated in FIG. 1 as embodied as a single server computing device, it should be appreciated that the contact status server 108 may be embodied as multiple devices cooperating together to facilitate the functionality described below. Further, the contact status server 108 may include components and features similar to typical data servers such as a processor, I/O subsystem, memory, data storage, communication circuitry, and various peripheral devices, which are not illustrated in FIG. 1 for clarity of the present description.

Figure 2:
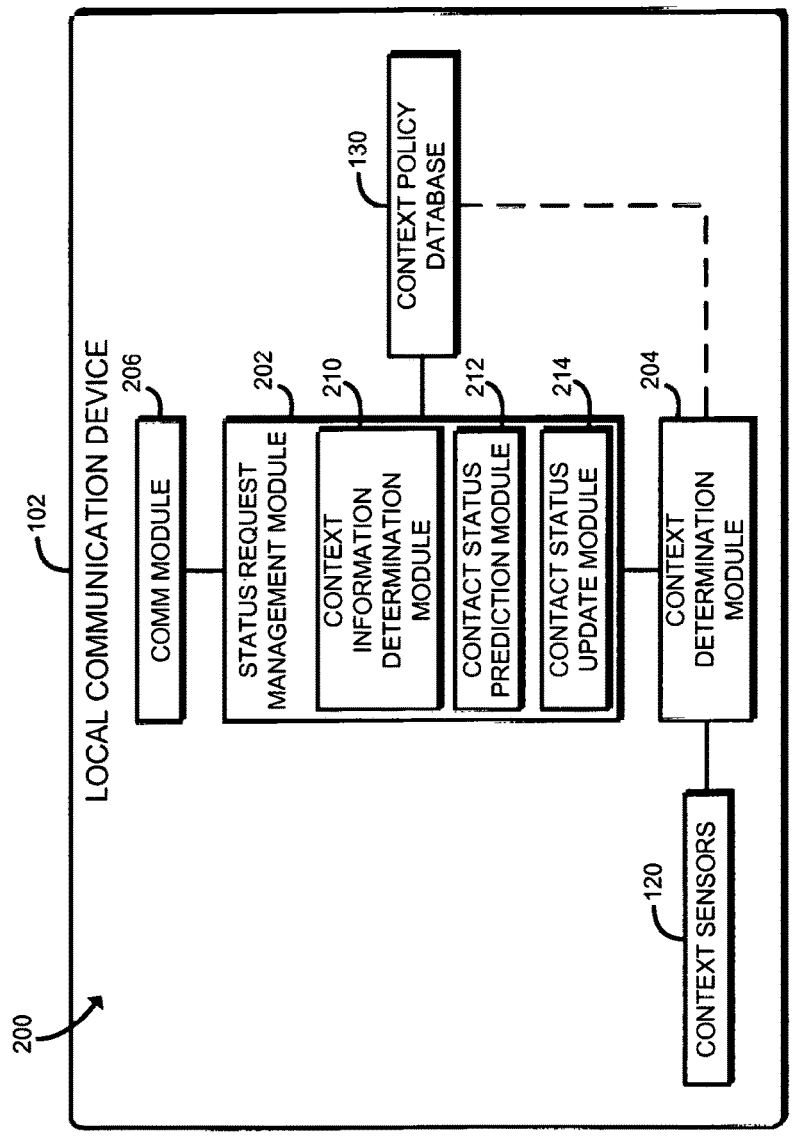
FIG. 2 is a simplified block diagram of at least one embodiment of an environment of a local communication device of the system of FIG. 1.

Referring now to FIG. 2, in the illustrative embodiment, the local communication device 102 establishes an environment 200 during operation. The illustrative environment 200 includes a status request management module 202, a context determination module 204, a communication module 206, the context sensors 120, and the context policy database 130. The various modules of the environment 200 may be embodied as hardware, firmware, software, or a combination thereof.

The status request management module 202 is configured to receive, manage, and respond to requests for contact status of the user of the local communication device 102, which may be received from the remote communication device 104 via the communication module 206. To do so, the status request management module 202 generates a contact status report, which is transmitted to the remote communication device 104 in response to the received contact status request. As discussed in more detail below, the contact status report may include context information indicative of the user's availability and/or desire to receive a contact from the user of the remote communication device 104 at the current time. As such, the status request management module 202 includes a context information determination module 210 configured to determine or generate context information based on the received contact status request and the user's current context, which is determined by the context determination module 204 as discussed below.

The context information generated by the context information determination module 210 may be embodied as any type of information providing an indication to the requestor (i.e., the user of the remote communication device 104) of the user's availability. Of course, depending on various factors (e.g., the identity of the requestor, the current activity of the user, etc.), the user of the local communication device 102 may desire to limit the specificity, type, or amount of context information that is provided to the user of the remote communication device 104. As such, the context information determination module 210 may determine the context information to be included in the contact status report based on a privacy level associated with the context status request (e.g., based on the identity of the user of the remote communication device 104). To do so, the context information determination module 210 may access the context policy database 130. The context policy database 130 may store various rules and policies for determining a privacy level based on the context status request and, in some embodiments, the context information to be included in the contact status report based on the determined privacy level and the user's current context. In this way, the amount, type, and/or specificity of the user's context may be controlled. For example, a high privacy level (e.g., assigned to a spouse of the user of the local communication device 102) may allow for very specific context data (e.g., actual GPS coordinates, detailed user activity information, etc.) to be included in the contact status report, while a low privacy level may allow only for an indication of whether the user is currently busy.

In some embodiments, the contact status report may include information in addition to, or in place of, the user's context information. For example, the status request management module 202 may determine a customized message, instructions, or other information to provide an indication of the availability/desirability of the user of the local communication device 102 to receive a contact. In such embodiments, the customized message, instructions, and/or other information may be stored in the context policy database 130.

In some embodiments, if the user of the local communication device 102 is currently unavailable to receive a contact, the contact status report may include a predicted or estimated future time at which the user is available to receive a contact from the user of the remote communication device 104. In such embodiments, the status request management module 202 may include a contact status prediction module 212 configured to analyze the user's context and determine a future time at which the user is available to receive a contact from the user of the remote communication device 104. To do so, the contact status prediction module 212 may analyze the context data generated by the context determination module 204 to determine a point in time at which the user is available, and include such information in the contact status report.

Additionally, if the user of the local communication device 102 is currently unavailable to receive a contact, the status request management module 202 may be configured to periodically, occasionally, and/or responsively update the remote communication device 104 with the user's availability. To do so, the status request management module 202 may include a contact status update module 214 to update the contact status report and periodically or occasionally transmit the updated contact status report to the remote communication device 104. Alternatively, in some embodiments, the remote communication device 104 may periodically or occasionally ping or request an updated contact status report from the local communication device 102, which may be handled by the contact status update module 214. In such embodiments, the updated contact status report may be similar to the originally transmitted contact status report but including updated context information or other data.

The context determination module 204 receives sensor data from the various context sensors 120 and determines context data based on such sensor data. The context determination module 204 may provide the determined context data directly to the status request management module 202 (e.g., in response to receipt of a contact status request) and/or store the context data in the context policy database 130 for future use (e.g., as historical context data). As discussed above, the context data may be embodied as any type of data indicative of the user's availability or desire to receive a contact. Additionally, as discussed above, the context policy database 130 may include various levels of context specificity and, as such, the context determination module 204 may be configured to determine context data at various levels of specificity.

It should be appreciated that in those embodiments in which the system 100 includes the contact status server 108, the server 108 may include similar modules as described above in regard to FIG. 2. For example, the server 108 may include a status request management module, a contact determination module, and a context policy data (which may a duplicate of the context policy database 130) to allow the server 108 to respond to contact status requests from the remote communication device 104 when the local communication device 102 is unavailable. The functionality of those modules is similar to the corresponding modules of the environment 200 described above.

Figure 3:
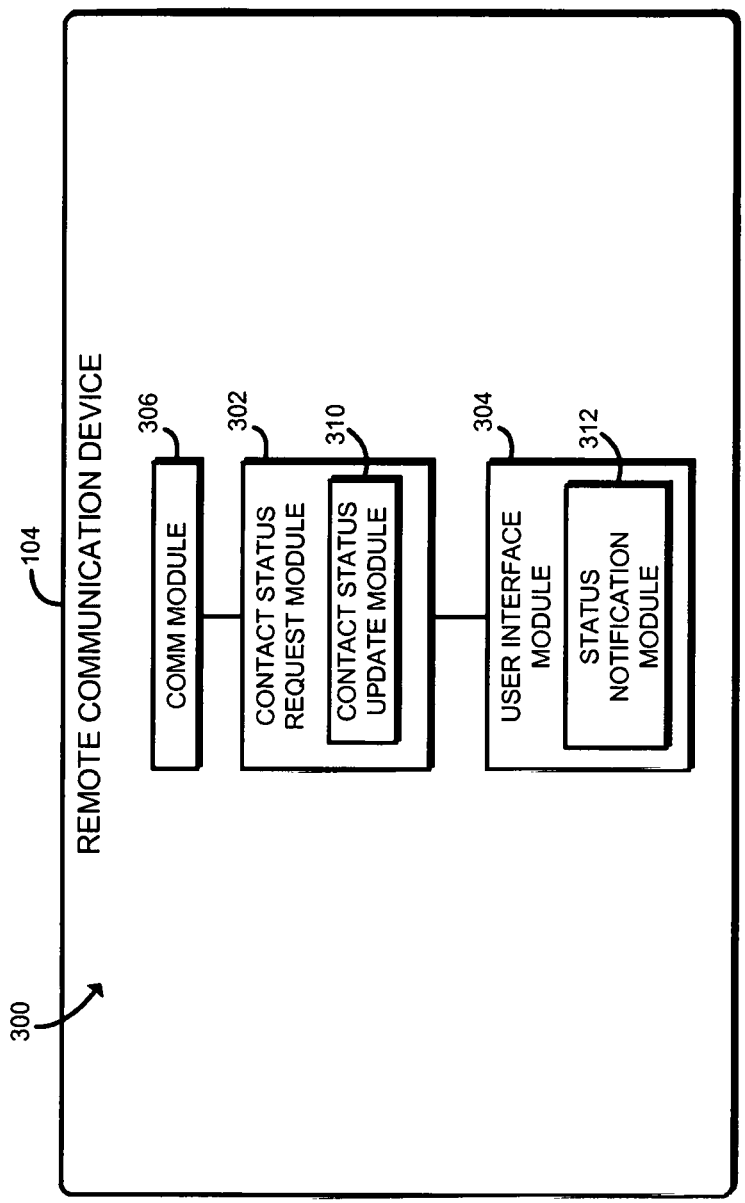
FIG. 3 is a simplified block diagram of at least one embodiment of an environment of a remote communication device of the system of FIG. 1.

Referring now to FIG. 3, in the illustrative embodiment, the remote communication device 104 establishes an environment 300 during operation. The illustrative environment 300 includes a contact status request module 302, a user interface module 304, and a communication module 306. The various modules of the environment 300 may be embodied as hardware, firmware, software, or a combination thereof.

As discussed above, a user of the remote communication device 104 may request a contact status of a user of the local communication device 102 prior to, during, or subsequent to contacting the user of the local communication device 102. To do so, the contact status request module 302 is configured to generate a contact status request and transmit the contact status request to the local communication device 102 via the communication module 306. The contact status request module 302 may generate the contact status request, for example, in response to a user's selection via the user interface module 304. The contact status request may be embodied as any type of information indicating desirability for the contact status of the user of the local communication device 102. In some embodiments, the contact status request may include identification data of the user of the remote communication device 104 and/or other data useful by the local communication device 102 in responding to the contact status request.

As discussed above, the local communication device 102 generates a contact status report in response to the contact status request. The contact status request module 302 receives the contact status report from the local communication device 102 via the communication module 306. The contact status request module 302 may subsequently present the contact status report, or information included therein, to the user of the remote communication device 104 via the user interface module 304.

In those situations in which the contact status report indicates that the user of the local communication device 102 is currently unavailable to receive a contact, the contact status request module 302 may request updates of the user's contact status. To facilitate such requests, the contact status request module 302 includes a contact status update module 310. In some embodiments, the contact status update module 310 is configured to periodically or occasionally ping or otherwise request a contact status update from the local communication device 102. Such update requests may occur with little to no interaction by the user of the remote communication device 104. For example, the contact status update module 310 may initiate the requests for contact status update automatically in response to receiving a contact status report indicating that the user of the local communication device 102 is unavailable to receive a contact at the current time. If the contact status update module 310 determines that the current contact status of the user of the local communication device 102 has changed (e.g., the user is now available to receive a contact), the contact status update module 310 may cooperate with a status notification module 312 of the user interface module 304 to present a notification to the user of the remote communication device 104. Such notification may be embodied as any type of notification including, for example, an audible, visual, or tactile notification configured to inform the user of the remote communication device 104 of the change in contact status of the user of the local communication device 102.

Figure 4:
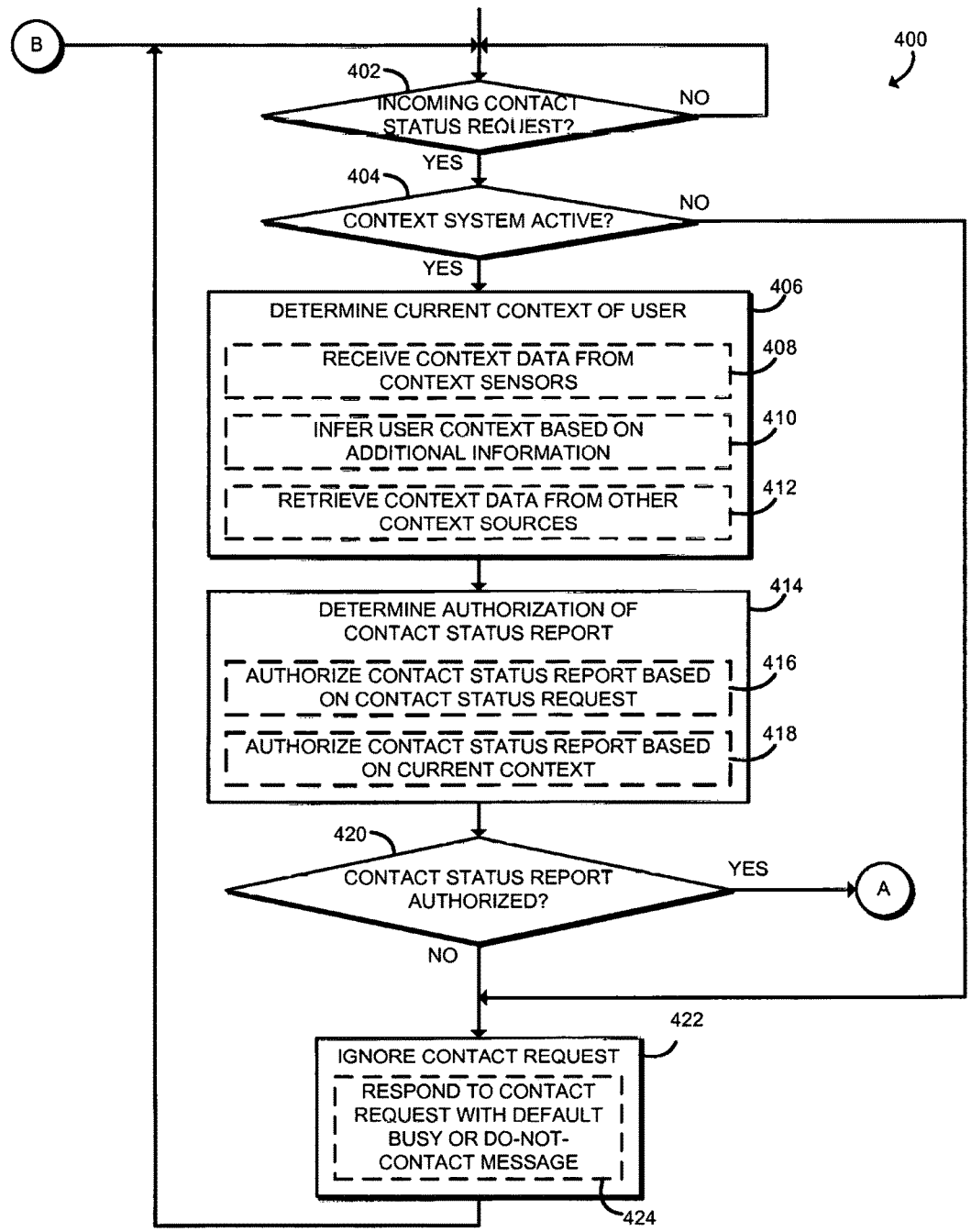
FIGS. 4 and 5 is a simplified flow diagram of at least one embodiment of a method for responding to a request for contact status of a user, which may be executed by the local communication device of the system of FIG. 1.
Figure 5:
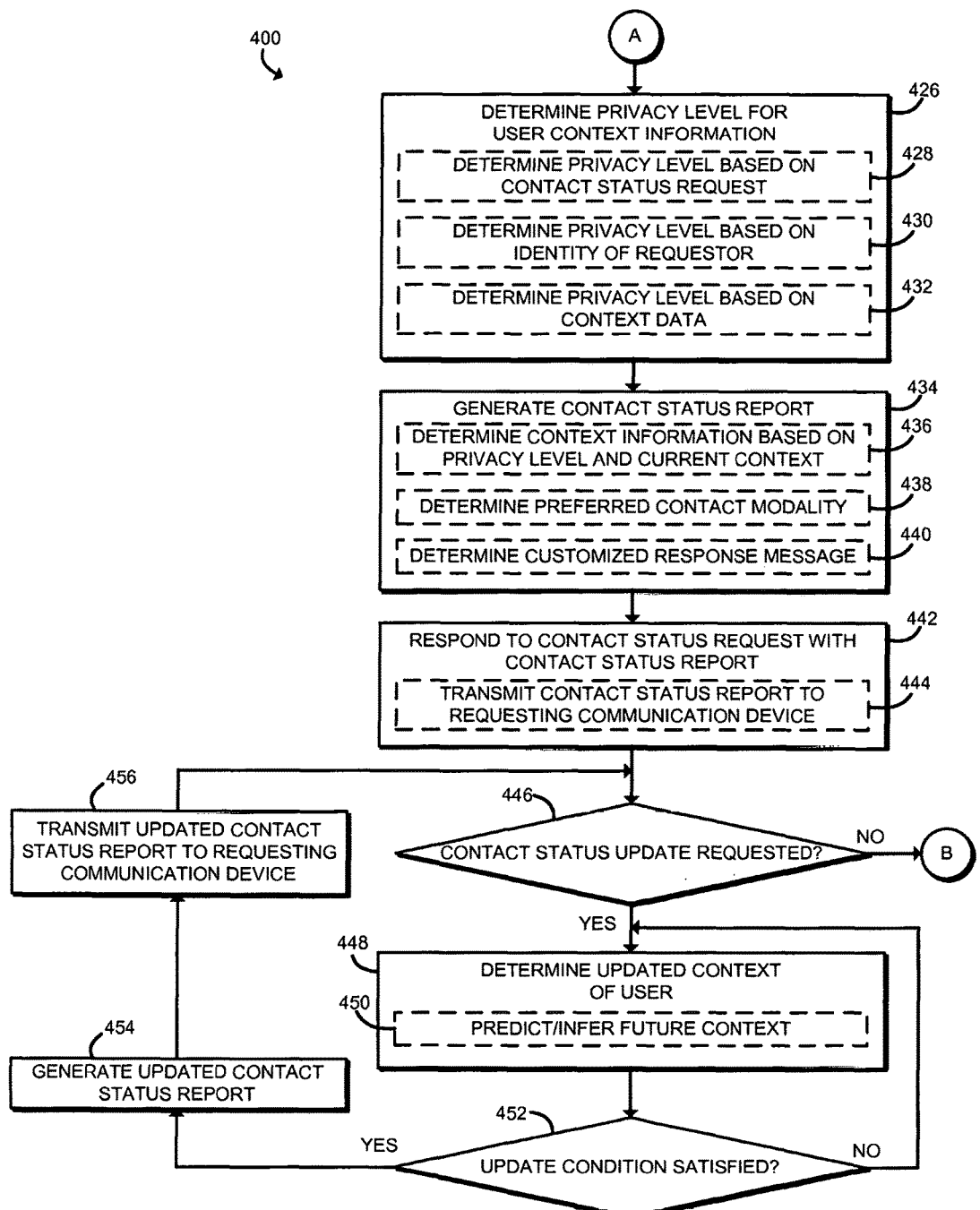

Referring now to FIGS. 4 and 5, in use, the local communication device 102 may execute a method 400 for responding to a request for contact status of a user of the device 102. The method 400 begins with block 402 in which the local communication device 102 determines whether a contact status request has been received. If so, the method 400 advances to block 404 in which the local communication device 102 determines whether the context system is active on the device 102. If not, the method 400 advances to block 422 in which the contact status request is ignored. In some embodiments, the local communication device 102 may simply not respond to the contact status request in any manner. Alternatively, in some embodiments in block 424, the local communication device 102 may respond to the contact status request with a default "busy" or "do-not-contact" message. Such messages are configured to inform the user of the remote communication device 104 that the user of the local communication device 102 should not be contacted at this time.

If, however, if the local communication device 102 determines that the context system is active, the method 400 advances to block 406 in which the local communication device 102 determines the current context of the user. To do so, in block 408, the local communication device 102 may receive and/or determine context data from the context sensors 120. For example, the context determination module 204 of the environment 204 may receive data signals from one or more of the context sensors 120 and determine context data indicative of the user's context based on such data signals. The context data may be embodied as any type of data or information useful in determining the availability of the user to receive a contact from the remote communication device 104 including, but not limited to the user's current location, the current activity of the user, the identity of the user, the user's emotional state, environmental conditions, the time of day, and/or other data indicative of the user's availability to receive the requested contact. The particular type of context data determined in block 406 (e.g., the user's location or current activity) may depend on the contact status request, the particular type of available context sensors 120, and/or other criteria. Additionally, although shown as occurring in block 406, it should be appreciated that the user's context may be continually or periodically determined regardless of whether a contact status request has been received. In such embodiments, the determined context data may be stored and/or updated in the context policy database 130.

In addition to typical context data, the local communication device 102 may utilize other data to determine or infer the user's context. For example in block 410, one or more of context analysis modules 128 of the local communication device 102 may analyze other data or information available on the local communication device 102 to infer the user's context. Such other data or information may be obtained from, for example, applications executing on the local communication device 102, application data or other data stored on the local communication device, and/or other data stored on or generated by the local communication device 102. For example, the local communication device 102 may be configured to analyze an e-mail or calendar application stored on the local communication device 102 to determine the user's context. Additionally or alternatively, the local communication device 102 may be configured to analyze text data from previous text communications. In this way, the local communication device 102 may analyze any type of data generated on or stored on the device 102 to generate context data indicative of the user's availability and/or desirability to receive a contact at the current time.

In some embodiments, in block 412, the local communication device 102 may alternatively or additionally retrieve context data from other context sources, such as context sources remote from the local communication device 102. For example, in some embodiments, the local communication device 102 may communicate with a remote server to retrieve data from which the user's context may be determined. In one illustrative example, the local communication device 102 may communicate with a remote e-mail, calendar, social network, or other cloud server to retrieve contacts data, event data, and/or other information indicative of the user's current context (e.g., information indicating that the user is in a meeting or traveling). In another illustrative example, the local communication device 102 may communicate with a remote server to determine specific information related to the user's current context, such as the user's current location or activity. For example, the local communication device 102 may communicate with a remote information server to determine the particular name and showing time of a movie the user is currently watching at a movie theater to thereby determine specific context information related to the user. Such communication with a remote server may be performed in semi-automatically (e.g., in response to authorization or selection by the user) or automatically in response to receipt of the contact status request.

As discussed above, the local communication device 102 is configured to respond to the contact status request with a contact status report, which may include context information of the user. However, in some embodiments, prior to responding to the contact status request, the local communication device 102 may determine whether a response to the contact status request (i.e., a contact status report) is authorized in block 414. Such authorization may be based on any useful data or criteria. In some embodiments, generation of a contact status report is authorized based on the contact status request itself in block 416. For example, the identification of the requestor (i.e., the user of the remote communication device 104 generating the contact status request) may be determined and authorization of the contact status report may be based on such identification. Additionally, in some embodiments, the local communication device 102 may be configured to communicate with a remote server to retrieve data to facilitate the determination of whether to authorize the contact status request. For example, the local communication device 102 communicate with a remote e-mail, calendar, social network, or other cloud server to retrieve contacts data, event data, and/or other information related to the user of the either device 102, 104 useful in determining whether to authorize the contact status request. In this way, a user of the local communication device 102 may control whether to respond to contact status requests from particular individuals. Additionally or alternatively, generation of a contact status report may be authorized based on the user current context in block 418. Such authorization may be based on any type of context data, such as the user's current activity or location. In this way, the user of the local communication device 102 may control whether to respond to contact status requests when the user is particularly busy (e.g., in a meeting) or in a location in which no contact is available or otherwise undesirable (e.g., on an airplane or in a court room).

In block 420, the local communication device 102 determines whether the contact status report has been authorized. If not, the method 400 advances to block 422 in which the contact status request is ignored. As discussed above, the local communication device 102 may simply not respond to the contact status request in any manner in block 422. Alternatively, in some embodiments in block 424, the local communication device 102 may respond to the contact status request with a default "busy" or "do-not-contact" message. Such messages are configured to inform the user of the remote communication device 104 that the user of the local communication device 102 should not be contacted at this time. Regardless, after the contact status request has been ignored or responded to with the default message, the method 400 loops back to block 402 in which the local communication device continues to monitor for incoming contact status requests.

Referring back to block 420, if the local communication device 102 determines that a contact status report is authorized, the method 400 advances to block 426 of FIG. 5. In block 426, the local communication device 102 determines a privacy level for the context information to be included in the contact status report. As discussed in more detail below, the privacy level may determine the type and/or level of specificity of context information of the user that is to be included in the contact status report. The privacy level may be determined based on any criteria. In some embodiments, the privacy level is based on the contact status request itself in block 428. For example, the privacy level may be based on the time the contact status request was received, the length of time since the last contact status request was received from the same requestor, and/or other aspects of the contact status request.

In some embodiments, the privacy level is based on the identity of the requestor (i.e., the identity of the user of the remote communication device 104) in block 430. That is, in some embodiments, the contact status request may include identification information of the user of the remote communication device 104 or data from which such identification information may be determined (e.g., an Electronic Serial Number (ESN), an Internet Protocol (IP) address, etc.). The privacy level may be determined, for example, by comparing the identification of the requestor to a privacy policy stored in the context policy database 130. For example, an illustrative privacy policy 600 is shown in FIG. 6. The privacy policy 600 includes a column 602 of requestor identifications and a column 604 of corresponding privacy level. In the illustrative embodiment, the requestor "John Q" has an assigned privacy level of "Medium" the requestor "Mom" has an assigned privacy level of "High," and the requestor "Sam" has an assigned privacy level of "Unauthorized". As such, the requestor "Mom" may be authorized to receive additional or more specific context information relative to the requestor "John Q," while the requestor "Sam" is not authorized to receive any context information. In some embodiments, the user of the local communication device 102 may actively assign the privacy levels to each requestor. In other embodiments, the local communication device 102 may infer or otherwise determine an appropriate privacy level based on historical information, such as level of contact between the requestor and user of the local communication device 102. Additionally, although only a few different privacy levels are illustrated in privacy policy 600, it should be appreciated that one, two, or more different privacy levels may be used in other embodiments.

Of course, similar to the authorization of the contact status request, the local communication device 102 may be configured to communicate with a remote server to retrieve data to facilitate the determination of a privacy level for the contact status request in some embodiments. In such embodiments, the local communication device 102 communicate with, for example, a remote e-mail, calendar, social network, or other cloud server to retrieve contacts data, event data, and/or other information related to the contact status request, the user of the remote communication device 104, and/or other data useful in determining an associated privacy level for the contact status request.

Referring back to FIG. 5, the local communication device 102 may additionally, or alternatively, determine a privacy level for the user context information based on the user's current context. For example, the privacy level of the user's context information may be adjusted or otherwise based on the current location or activity of the user. In an illustrative example, the level of specificity of the context information may be decreased for all requestors (i.e., even requestors with "High" privacy level privileges) when the user is participating in a particular activity such as watching a movie (e.g., the user's context may simply be set to "busy"). In this way, the user of the local communication device 102 may control the type and or detail of reported context information based on the user's activities, location, or other context to provide an amount of global privacy for the user.

After the local communication device 102 has determined the appropriate privacy level for the user context information in block 426, the method 400 advances to block 434 in which the local communication device 102 generates a contact status report. As discussed above, the context status report may include context information of the user of the local communication device that indicates the user's availability and/or desire to receive a contact from the user of the remote communication device 104. As such, the local communication device 102 may generate, in block 436, the context information based on the privacy level determined in block 426 and the user's current context. To do so, in some embodiments, the local communication device 102 may compare the determined privacy level and user's context to a context policy stored in the context policy database 130. An illustrative context policy 700 is shown in FIG. 7. The illustrative context policy 700 includes a column 702 of context information and columns 704, 706, 708 of varying privacy levels. Each privacy level column 704, 706, 708 includes a context information column 710 that provides or indicates the appropriate context information to be included in the contact status report for the corresponding context and an availability column 712 that defines the user's availability to receive a contact. For example, the context policy 700 may include an activity entry 720 and a location entry 722 for each defined activity and location, respectively. As shown in FIG. 7, the activity entry 720 and the location entry 722 includes context information of different levels of specificity (i.e., low level, medium level, and high level) for each privacy level 704, 706, 708. Additionally, the activity entry 720 and the location entry 722 includes corresponding contact instructions, which may be different based on the particular privacy level as discussed in more detail below. By comparing the determined privacy level and user's contact, the local communication device 102 may generate context information that includes the current context of the user in varying levels of specificity based on the associated privacy level and an indication of whether the user is available to receive a contact at the current time, which may also be based on the privacy level.

For example, if the user's activity context is to be included in the context information and the user is currently watch a movie as indicated in activity entry 724, the associated activity context may be defined as "busy" for a determined "Low" privacy level, as "At Movies" for a determined "Medium" privacy level, or "At Batman Movie Until 7:00 PM" for a determined "High" privacy level. Additionally, the user's availability to receive a contact from the user of the remote communication device 104 may be defined as "Do Not Contact" for each of the "Low," "Medium," and "High" privacy levels. As another example, if the user's location context is to be included in the context information and the user is currently at home as indicated in location entry 726, the associated location context may be defined as "New York" for a determined "Low" privacy level, as "At Home" for a determined "Medium" privacy level, or the actual GPS coordinates of the user's home for a determined "High" privacy level. Additionally, the user's availability to receive a contact from the user of the remote communication device 104 may be defined as "Do Not Contact" for a determined "Low" privacy level or as "Ok To Contact" for a determined "Medium" or "High" privacy level. In addition to determining the level of specificity of the context information to be included in the contact status report, the context policy may also include rules or policies for the context information based on the user's current context. For example, as shown in the illustrative context policy 700, if the user is currently on an airplane as indicated in location entry 728, the user's context information and availability is defined as "Busy" and "Do Not Contact" for all privacy levels. Of course, it should be appreciated that the context policy 702 is merely one embodiment of a context policy and associated data that may be used with the technologies disclosed herein. In other embodiments, context policies and databases having other configurations or structures may be used.

Referring back to FIG. 5, in addition to context information of the user, the contact status report may include a preferred contact modality in some embodiments, such as voice, text, e-mail, or other contact mechanism. In such embodiments, the local communication device 102 may determine the preferred contact modality in block 438. To do so, the local communication device 102 may determine the preference context modality based on any criteria or information including, but not limited to, the current context of the user, the identification of the requestor, the contact status request, and/or other information. Additionally, in some embodiments, the contact status report may include a customized response message. In such embodiments, the local communication device 102 determines the customized response message in block 440. The customized response message may be based on any criteria, such as the user's context and/or the identification of the requestor, and may be pre-defined by the user or generated by the local communication device 102. The customized response message may be embodied as any type of message providing additional information to the user of the remote communication device 104 such as, for example, the user's calendar for the rest of the day, instructions for contacting the user, estimated best times to contact the user, and so forth.

After the contact status report is generated in block 434, the method 400 advances to block 442 in which the local communication device 102 responds to the contact status request received from the remote communication device 104 with the contact status report. For example, in block 444, the local communication device 102 may transmit the contact status report to the remote communication device 104. In some embodiments, if the user of the local communication device 102 is unable or unwilling to accept a contact from the user of the remote communication device 104 at the current time, a contact status update may be requested. For example, the original contact status request may include an indication that contact status request updates are requested if the user of the local communication device 102 is determined to be busy. Alternatively, the remote communication device 104 may actively request such contact status updates in response to receiving a contact status report indicating the user of the local communication device 102 is busy and unable to receive a contact at the current time. Regardless, in block 446, the local communication device 102 determines whether a contact status update has been requested. If no contact status update has been requested, the method 400 loops back to block 402 of FIG. 4 to monitor for additional contact status requests.

However, if a contact status update has been requested, the method 400 advances to block 448 in which the local communication device 102 determines updated context information. To do so, the local communication device 102 may determine the current context of the user as described above in regard to block 406, which may have changed since the last context determination. Additionally, in some embodiments, the local communication device may determine, predict, or otherwise infer a future context of the user based on the user's current context in block 450. For example, if the user is current watching a movie, the local communication device 102 may infer that the user will be available to receive a contact upon the completion of the movie. Alternatively, if the user is traveling via airplane, the local communication device 102 may infer that the user will be available to receive a contact upon completion of the flight. In this way, the local communication device 102 may report, in addition to the user's current context, a likely future time at which the user may receive a contact from the user of the remote communication device 104.

In block 452, the local communication device 102 determines whether an update condition has been satisfied. An update condition may be embodied as any event or other condition upon which the remote communication device 104 should be updated with the user's current contact status. For example, in some embodiments, the update condition may be temporal (e.g., the local communication device may be configured to update the remote communication device with the user's current contact status periodically). Additionally or alternatively, the update condition may be a specific update request from the remote communication device 104.

For example, the remote communication device 104 may periodically, occasionally, or responsively ping the local communication device 102 for a contact status update. If the update condition has not been satisfied, the method 400 loops back to block 448 in which the user's context is again updated. However, if the update condition has been satisfied (e.g., an update timer has expired), the method 400 advances to block 454 in which the local communication device 102 generates an updated contact status report. The updated contact status report may be substantially similar to the contact status report generated in blocks 426-440, and the local communication device 102 may use a similar methodology to generate the updated contact status report. After the updated contact status request has been generated, the local communication device 102 transmits the updated contact status report to the remote communication device 104 in block 456. The method subsequently loops back to block 446 in which the local communication device 102 again determines whether a contact status updates has been requested. In this way, the remote communication device 104 may be periodically or responsively updated as to the contact status of the user of the local communication device 102 with little or no interaction between the users of the devices 102, 104. It should be appreciated that the update request may form part of the original contact status request as discussed above, be embodied as a separate request and communication, and/or be pre-configured to occur. Accordingly, in some embodiments, the method of blocks 446-456 may be executed at any time in response to receipt of an update request or a determination that an update has been otherwise been requested. For example, the method of blocks 446-456 may be executed contemporaneously with the execution of the other blocks of the method 400.

Figure 8:
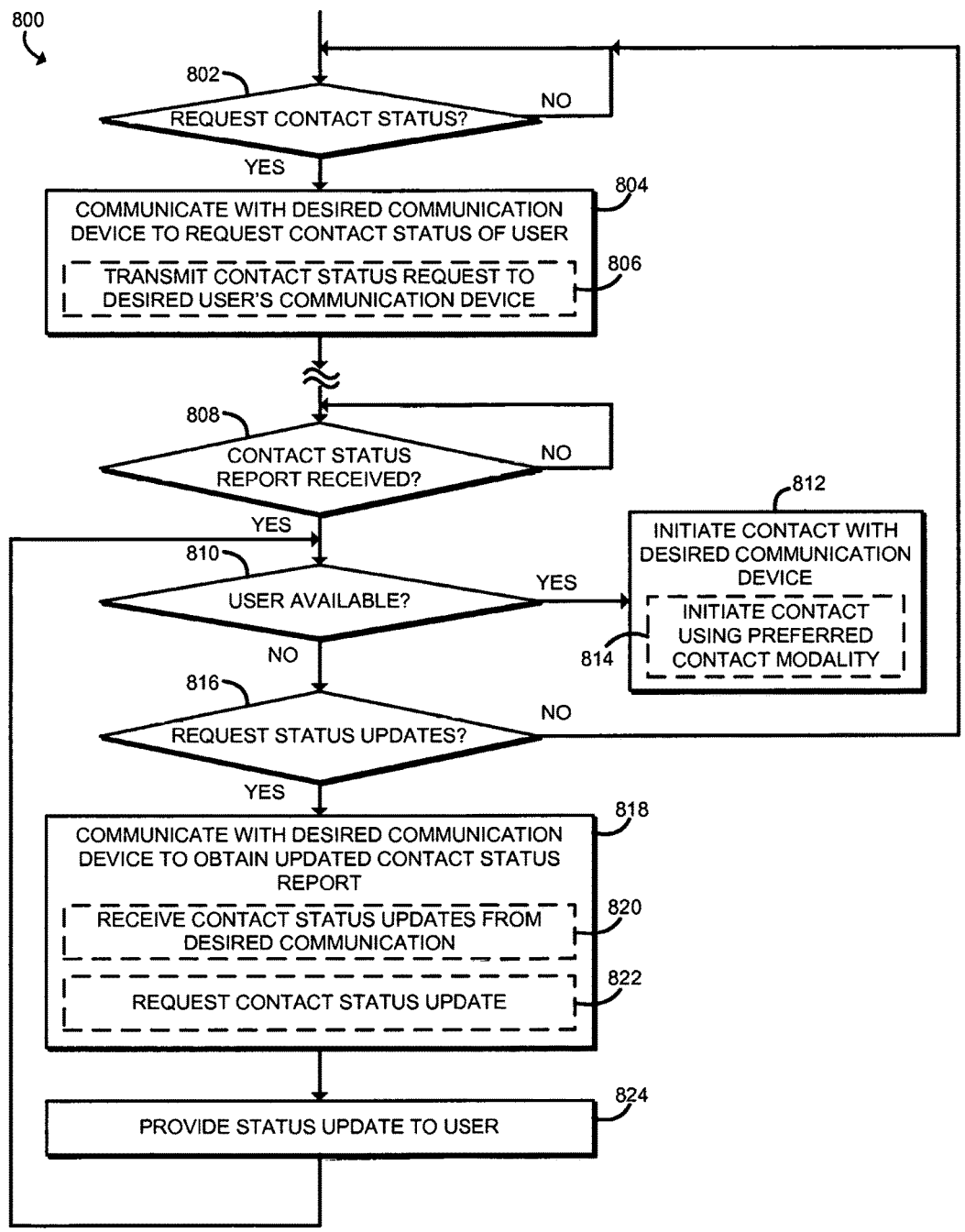
FIG. 8 is a simplified flow diagram of at least one embodiment of a method for requesting a contact status of a user of a communication device, which may be executed by the remote communication device of the system of FIG. 1.

Referring now to FIG. 8, in use, the remote communication device 104 may execute a method 800 for requesting a contact status of a user of the local communication device 102. The method 800 begins with block 802 in which the remote communication device 104 determines whether a contact status of the user of the local communication device 102 is to be requested. If so, the method 800 advances to block 804 in which the remote communication device 104 communicates with the local communication device 102 to request the contact status of the user. It should be appreciated that by requesting the contact status of the user prior to initiating actual contact (i.e., prior to contacting the user via voice, text, e-mail, or other contact modality), the user of the remote communication device 104 may be provided some assurances that the user of the local communication device 102 is available to receive the contact and that the user of the remote communication device 104 is not bothering or interrupting the user of the local communication device 102.

To initiate the contact request, the remote communication device 104 transmits the contact status request to the local communication device 102 in block 806. The contact status request may be embodied as any type of data capable of indicating a request for the contact status of the user of the local communication device 102. As discussed above, the contact status request may include additional information, such as identification information of the user of the remote communication device 104, in some embodiments. After the contact status request has been transmitted, the remote communication device 104 determines whether a contact status report has been received from the local communication device 102 in block 808. If so, the method 800 advances to block 810 in which the remote communication device 104 determines whether the user of the local communication device 102 is available to receive a contact at the current time. As discussed above, the contact status report may include an indication, either directly or via other information, of the availability of the user of the local communication device 102 to receive a contact at the current time. If the remote communication device 104 determines that the user of the local communication device 102 is currently available to receive a contact, the method 800 advances to block 812. In block 812, the remote communication device 104 initiates contact with the local communication device 102. To do so, in some embodiments, the remote communication device 104 initiates contact with the local communication device 102, in block 814, using a preferred contact modality as indicated in the contact status report. Such initiation of contact with the local communication device 102 may occur automatically or in response to a user's selection as normal.

Referring back to block 810, if the remote communication device 104 determines, based on the contact status report, that the user of the local communication device 102 is not available to receive a contact at the current time, the method 800 advances to block 816. In block 816, the remote communication device 104 determines whether contact status updates are desired by the user of the remote communication device 104. As discussed above, in some embodiments, the contact status request may indicate a desire to receive contact status updates in the event the user of the local communication device 102 is determined to be unavailable to receive a contact at the current time. Alternatively, in other embodiments, the user of the remote communication device 104 may elect to receive contact status updates in response to receiving a contact status report indicating the user of the unavailable to receive a contact at the current time. For example, the user of the remote communication device 104 may select an option to periodically ping or otherwise request contact status updates. If no contact status updates from the local communication device 102 are desired, the method 800 loops back to block 802 in which the remote communication device 104 determine whether an additional contact status is requested.

If, however, contact status updates are desired, the method 800 advances to block 818 in which the remote communication device 104 communicates with the local communication device 102 to obtain an updated contact status report. For example, in some embodiments as discussed above, the local communication device 102 may periodically or occasionally transmit updated contact status reports. In such embodiments, the remote communication device 104 receives the periodic or occasional updated contact status reports in block 820. Additionally or alternatively, the remote communication device 104 may periodically or occasionally ping the local communication device 102 for updated contact status reports in block 822. Regardless, after an updated contact status report is received from the local communication device 102, the context information (and/or other information) included in the updated contact status report is displayed or otherwise presented to the user of the remote communication device in block 824.

EXAMPLES

Illustrative examples of the devices, systems, and methods disclosed herein are provided below. An embodiment of the devices, systems, and methods may include any one or more, and any combination of, the examples described below.

Example 1 includes a communication device for responding to a contact status request, the communication device comprising a communication module to receive a contact status request from a remote communication device; a context determination module to determine a context of a user of the communication device based on data generated by one or more context sensors of the communication device; and a status request management module to (i) determine a privacy level based on the contact status request, (ii) determine context information based on the determined context and the determined privacy level; and (iii) generate a contact status report including the context information; wherein the communication module is to transmit the contact status report to the remote communication device in response to the contact status request.

Example 2 includes the subject matter of Example 1, and wherein the status request management module is further to determine whether an update condition is satisfied; and update the remote communication device with an updated contact status report in response to a determination that the update condition is satisfied.

Example 3 includes the subject matter of any of Examples 1 and 2, and wherein to determine whether the update condition is satisfied comprises to determine whether a reference amount of time has lapsed since the transmittal of the contact status report.

Example 4 includes the subject matter of any of Examples 1-3, and wherein to determine whether the update condition is satisfied comprises to determine whether a subsequent contact status request has been received from the remote communication device.

Example 5 includes the subject matter of any of Examples 1-4, and wherein to update the remote communication device comprises to determine an updated context of the user of the communication device; and determine the updated contact status report based on the updated context of the user and the determined privacy level.

Example 6 includes the subject matter of any of Examples 1-5, and wherein the context of the user comprises a location, an activity, or an emotional state of the user of the communication device.

Example 7 includes the subject matter of any of Examples 1-6, and wherein to determine the context of the user comprises to retrieve context data from a remote source.

Example 8 includes the subject matter of any of Examples 1-7, and wherein to determine the context of the user comprises to analyze data associated with an application executed by the communication device.

Example 9 includes the subject matter of any of Examples 1-8, and wherein to determine the privacy level comprises to determine a privacy level based on an identification of the user of the remote communication device from which the contact status request is received.

Example 10 includes the subject matter of any of Examples 1-9, and wherein to determine a privacy level based on the identification of the user of the remote communication device comprises to communicate with a remote server to retrieve data indicative of the identity of the user of the remote communication device, and determine a privacy level based on the retrieved data.

Example 11 includes the subject matter of any of Examples 1-10, and wherein to determine a privacy level based on the identification of the user of the remote communication device comprises to determine the identification of the user of the remote communication device based on data locally stored on the communication device.

Example 12 includes the subject matter of any of Examples 1-11, and wherein to determine the privacy level comprises to determine a privacy level based on the contact status request and the determined context of the user.

Example 13 includes the subject matter of any of Examples 1-12, and wherein to determine the privacy level comprises to determine one of a plurality of pre-defined privacy levels, wherein each privacy level is associated with a level of specificity of the context of the user.

Example 14 includes the subject matter of any of Examples 1-13, and wherein each privacy level is associated with a type of context data authorized to be included in the contact status report.

Example 15 includes the subject matter of any of Examples 1-14, and wherein to determine the context information comprises to retrieve the context information from a database based on the determined privacy level.

Example 16 includes the subject matter of any of Examples 1-15, and wherein the communication device comprises a context policy database, and wherein to determine the context information comprises to retrieve context information from the context policy database based on the determined context of the user and the determined privacy level.

Example 17 includes the subject matter of any of Examples 1-16, and wherein the contact status report includes a response message determined based on the determined privacy level.

Example 18 includes the subject matter of any of Examples 1-17, and wherein the contact status report includes a response message determined based on an identification of the user of the remote communication device from which the contact status request is received.

Example 19 includes the subject matter of any of Examples 1-18, and wherein the status request management module is further to determine whether the contact status report is authorized based on (i) an identification of the user of the remote communication device from which the contact status request is received or (ii) the determined context of the user, and wherein the communication module is to transmit a message to request the user of the remote communication device not contact the user of the communication device in response to a determination that the contact status report is not authorized.

Example 20 includes a communication device to request a contact status of a user of a remote communication device, the communication device comprising a communication module to transmit a contact status request to the remote communication device, the contact status request to request the availability of the user of the remote communication device to receive a contact from a user of the communication device; a contact status request module to (i) receive, from the remote communication device, a contact status report including context information of the user of the remote communication device that indicates the availability of the user of the remote communication device to receive the contact from the communication device and (ii) generate a request for an updated contact status in response indication by the contact status report that the user of the remote communication device is not available to receive the contact from the communication device, wherein the communication module is to transmit the request for the updated contact status to the remote communication device.

Example 21 includes the subject matter of Example 20, and wherein to generate the request for the updated contact status report comprises to periodically generate a request for the updated contact status report.

Example 22 includes the subject matter of any of Examples 20 and 21, and wherein the communication module is further to receive updated contact status reports from the remote communication device in response to (i) transmittal of the request for the updated contact status report and (ii) the unavailability of the user of the remote communication device to receive the contact from the communication device.

Example 23 includes the subject matter of any of Examples 20-22, and wherein the communication module is further to initiate contact with the remote communication device in response to the contact status report indicating the user of the remote communication device is available to receive the contact from the communication device.

Example 24 includes a method for responding to a contact status request, the method comprising receiving, by a local communication device, a contact status request from a remote communication device; determining, by the local communication device, a context of a user of the local communication device based on data generated by one or more context sensors of the local communication device; determining, by the local communication device, a privacy level based on the contact status request; determining, by the local communication device, context information based on the determined context of the user and the determined privacy level; generating, by the local communication device, a contact status report in response to the contact status request, the contact status report including the context information; and responding, by the local communication device, to the contact status request with the contact status report.

Example 25 includes the subject matter of Example 24, and further including determining whether an update condition is satisfied; and updating the remote communication device with an updated contact status report in response to the update condition being satisfied.

Example 26 includes the subject matter of any of Examples 24 and 25, and wherein determining whether the update condition is satisfied comprises determining whether a reference amount of time has lapsed since responding to the contact status request with the contact status report.

Example 27 includes the subject matter of any of Examples 24-26, and wherein determining whether the update condition is satisfied comprises determining whether a subsequent contact status request has been received from the remote communication device.

Example 28 includes the subject matter of any of Examples 24-27, and wherein updating the remote communication device comprises determining an updated context of the user of the local communication device; and determining the updated contact status report based on the updated context of the user and the determined privacy level.

Example 29 includes the subject matter of any of Examples 24-28, and wherein determining the context of the user comprises determining a location, an activity, or an emotional state of the user of the local communication device.

Example 30 includes the subject matter of any of Examples 24-29, and wherein determining the context of the user comprises retrieving context data from a remote source.

Example 31 includes the subject matter of any of Examples 24-30, and wherein determining the context of the user comprises analyzing data associated with an application executed by the local communication device.

Example 32 includes the subject matter of any of Examples 24-31, and wherein determining a privacy level comprises determining a privacy level based on an identification of the user of the remote communication device from which the contact status request is received.

Example 33 includes the subject matter of any of Examples 24-32, and wherein to determining a privacy level based on the identification of the user of the remote communication device comprises communicating with a remote server to retrieve data indicative of the identity of the user of the remote communication device, and determining a privacy level based on the retrieved data.

Example 34 includes the subject matter of any of Examples 24-33, and wherein to determining a privacy level based on the identification of the user of the remote communication device comprises determining the identification of the user of the remote communication device based on data locally stored on the communication device.

Example 35 includes the subject matter of any of Examples 24-34, and wherein determining a privacy level comprises determining a privacy level based on the contact status request and the determined context of the user.

Example 36 includes the subject matter of any of Examples 24-35, and wherein determining a privacy level comprises determining one of a plurality of pre-defined privacy levels, wherein each privacy level is associated with a level of specificity of the context of the user.

Example 37 includes the subject matter of any of Examples 24-36, and wherein each privacy level is associated with a type of context data authorized to be included in the contact status report.

Example 38 includes the subject matter of any of Examples 24-37, and wherein determining the context information comprises retrieving context information from a database based on the determined privacy level.

Example 39 includes the subject matter of any of Examples 24-38, and wherein determining the context information comprises retrieving context information from a context policy database based on the determined context of the user and the determined privacy level.

Example 40 includes the subject matter of any of Examples 24-39, and wherein generating the contact status report comprises generating a contact status report including a response message determined based on the determined privacy level.

Example 41 includes the subject matter of any of Examples 24-40, and wherein generating the contact status report comprises generating a contact status report including a response message determined based on an identification of the user of the remote communication device from which the contact status request is received.

Example 42 includes the subject matter of any of Examples 24-41, and further including determining whether the contact status report is authorized based on (i) an identification of the user of the remote communication device from which the contact status request is received or (ii) the determined context of the user; and responding, by the local communication device, to the contact status request with a message requesting the user of the remote communication device not contact the user of the local communication device in response to the contact status report not being authorized.

Example 43 includes a method for requesting a contact status of user of a remote communication device, the method comprising transmitting, by a local communication device, a contact status request to the remote communication device, the contact status request requesting the availability of the user of the remote communication device to receive a contact from a user of the local communication device; receiving, by the local communication device and from the remote communication device, a contact status report including context information of the user of the remote communication device that indicates the availability of the user of the remote communication device to receive the contact from the local communication device; and requesting, by the local communication device, an updated contact status report in response to the contact status report indicating that the user of the remote communication device is not available to receive the contact from the local communication device.

Example 44 includes the subject matter of Example 43, and wherein requesting the updated contact status report comprises periodically contacting the remote communication device to request the updated contact status report.

Example 45 includes the subject matter of any of Examples 43 and 44, and further including receiving, by the local communication device, updated contact status reports from the remote communication device in response to (i) requesting the updated contact status report and (ii) the user of the remote communication device being unavailable to receive the contact from the local communication device.

Example 46 includes the subject matter of any of Examples 43-45, and further including initiating, by the local communication device, contact with the remote communication device in response to the contact status report indicating the user of the remote communication device is available to receive the contact from the local communication device.

Example 47 includes a communication device comprising a processor; and a memory having stored therein a plurality of instructions that when executed by the processor cause the computing device to perform the method of any of Examples 24-46.

Example 48 includes one or more machine-readable storage media comprising a plurality of instructions stored thereon that in response to being executed result in a communication device performing the method of any of Examples 24-46.

Example 49 includes a communication device comprising means for performing the method of any of Examples 24-46.

The invention claimed is:

1. A communication device for responding to a contact status request, the communication device comprising:
a processor; and
a memory that comprises instructions stored thereon, which when executed by the processor, causes the communication device to:
receive a contact status request from a remote communication device;
determine a context of a user of the communication device based on at least one of (i) data generated by one or more context sensors of the communication device, (ii) data retrieved from other context sources, or (iii) inference on additional information;
determine whether generating a contact status report to the contact status request is authorized, wherein the contact status report includes context information of the user; identify, in response to a determination that generating the contact status report is authorized, a privacy level of a plurality of predefined privacy levels based on an identification of a user of the remote communication device that sent the contact status request, wherein each privacy level is associated with a level of specificity of the context of the user of the communication device;
determine context information based on the determined context and the level of specificity defined by the identified privacy level;
generate a contact status report including the context information and a preferred communication modality to receive a contact from the remote communication device; and
transmit the contact status report to the remote communication device in response to the contact status request;
wherein the contact status report further includes a predicted or estimated future time at which the user of the communication device is available to receive a contact from the user of the remote communication device.

2. The communication device of claim 1, wherein the memory further comprises instructions stored thereon, which when executed by the processor, causes the communication device to:
determine whether an update condition is satisfied; and
update the remote communication device with an updated contact status report in response to a determination that the update condition is satisfied.

3. The communication device of claim 2, wherein to determine whether the update condition is satisfied comprises to determine at least one of (i) whether a reference amount of time has lapsed since the transmittal of the contact status report and (ii) whether a subsequent contact status request has been received from the remote communication device.

4. The communication device of claim 2, wherein to update the remote communication device comprises to:
determine an updated context of the user of the communication device; and
determine the updated contact status report based on the updated context of the user and the identified privacy level.

5. The communication device of claim 1, wherein to identify a privacy level based on the identification of the user of the remote communication device comprises to:
communicate with a remote server to retrieve data indicative of the identity of the user of the remote communication device, and
identify a privacy level based on the retrieved data.

6. The communication device of claim 1, wherein to identify the privacy level comprises to identify a privacy level based on the contact status request and the determined context of the user.

7. The communication device of claim 1, wherein the communication device comprises a context policy database, and wherein to determine the context information comprises to retrieve context information from the context policy database based on the determined context of the user and the identified privacy level.

8. One or more non-transitory machine-readable storage media comprising a plurality of instructions stored thereon that, in response to execution by a communication device, cause the communication device to:
receive a contact status request from a remote communication device;
determine a context of a user of the communication device based on at least one of (i) data generated by one or more context sensors of the communication device, (ii) data retrieved from other context sources, or (iii) inference on additional information;
determine whether generating a contact status report to the contact status request is authorized, wherein the contact status report includes context information of the user;
identify, in response to a determination that generating the contact status report is authorized, a privacy level of a plurality of predefined privacy levels based on an identification of a user of the remote communication device that sent the contact status request, wherein each privacy level is associated with a level of specificity of the context of the user;

determine context information based on the determined context of the user of the communication device and the level of specificity defined by the identified privacy level;

generate a contact status report in response to the contact status request, the contact status report including the context information and a preferred communication modality to receive a contact from the remote communication device; and respond to the contact status request with the contact status report;

wherein the contact status report further includes a predicted or estimated future time at which the user of the communication device is available to receive a contact from the user of the remote communication device.

9. The one or more non-transitory machine-readable storage media of claim 8, wherein the plurality of instructions, in response to execution, further cause the communication device to:

determine whether an update condition is satisfied; and
update the remote communication device with an updated contact status report in response to the update condition being satisfied.

10. The one or more non-transitory machine-readable storage media of claim 9, wherein to determine whether the update condition is satisfied comprises to determine at least one of (i) whether a reference amount of time has lapsed since the transmittal of the contact status report and (ii) whether a subsequent contact status request has been received from the remote communication device.

11. The one or more non-transitory machine-readable storage media of claim 9, wherein to update the remote communication device comprises to:

determine an updated context of the user of the local communication device; and
determine the updated contact status report based on the updated context of the user and the identified privacy level.

12. The one or more non-transitory machine-readable storage media of claim 8, wherein to identify a privacy level based on the identification of the user of the remote communication device comprises to:

communicate with a remote server to retrieve data indicative of the identity of the user of the remote communication device, and
identify a privacy level based on the retrieved data.

13. The one or more non-transitory machine-readable storage media of claim 8, wherein to identify a privacy level comprises to identify a privacy level based on the contact status request and the determined context of the user.

14. The one or more non-transitory machine-readable storage media of claim 8, wherein to determine the context information comprises to retrieve context information from a context policy database based on the determined context of the user and the identified privacy level.

15. A method for responding to a contact status request, the method comprising:

receiving, by a local communication device, a contact status request from a remote communication device;
determining, by the local communication device, a context of a user of the local communication device based on at least one of (i) data generated by one or more context sensors of the communication device, (ii) data retrieved from other context sources, or (iii) inference on additional information;
determining, by the local communication device, whether generating a contact status report to the contact status request is authorized, wherein the contact status report includes context information of the user;
identifying, in response to a determination that generating the contact status report is authorized and by the local communication device, a privacy level of a plurality of predefined privacy levels based on identification of a user of the remote communication device that sent the contact status request, wherein each privacy level is associated with a level of specificity of context of the user of the communication device;
determining, by the local communication device, context information based on the determined context of the user and the level of specificity defined by the identified privacy level;
generating, by the local communication device, a contact status report in response to the contact status request, the contact status report including the context information and a preferred communication modality to receive a contact from the remote communication device; and
responding, by the local communication device, to the contact status request with the contact status report;
wherein the contact status report further includes a predicted or estimated future time at which the user of the communication device is available to receive a contact from the user of the remote communication device.

16. The method of claim 15, further comprising:
determining whether an update condition is satisfied; and
updating the remote communication device with an updated contact status report in response to the update condition being satisfied.

17. The method of claim 16, wherein determining whether the update condition is satisfied comprises determining at least one of (i) whether a reference amount of time has lapsed since the transmittal of the contact status report and (ii) whether a subsequent contact status request has been received from the remote communication device.

18. A communication device to request a contact status of a user of a remote communication device, the communication device comprising:

a processor; and
a memory that comprises instructions stored thereon, which when executed by the processor, causes the communication device to:
transmit a contact status request to the remote communication device, the contact status request to request the availability of the user of the remote communication device to receive a contact from a user of the communication device;
receive, in response to the contact status request being authorized by the remote communication device and from the remote communication device, a contact status report including context information of the user of the remote communication device that indicates the availability of the user of the remote communication device to receive the contact from the communication device, a predicted or estimated future time at which the user of the communication device is available to receive a contact from the user of the remote communication device, and a preferred communication modality to receive a contact from the communication device, wherein the context information is based on a level of specificity defined by a privacy level of a plurality of predefined privacy levels and at least one of (i) data generated by one or more context sensors of the remote communication device, (ii) data retrieved from other context sources, or (iii) inference on additional information, wherein the privacy level is identified based on an identification of the user of the communication device, and wherein each privacy level is associated with a level of specificity of the context of the user of the remote communication device;

generate a request for an updated contact status in response indication by the contact status report that the user of the remote communication device is not available to receive the contact from the communication device; and transmit the request for the updated contact status to the remote communication device.

19. The communication device of claim 18, wherein the memory further comprises instructions stored thereon, which when executed by the processor, causes the communication device to receive updated contact status reports from the remote communication device in response to (i) transmittal of the request for the updated contact status report and (ii) the unavailability of the user of the remote communication device to receive the contact from the communication device.

* * * * *